(12) United States Patent
Tang et al.

(10) Patent No.: US 7,609,146 B2
(45) Date of Patent: Oct. 27, 2009

(54) SYSTEM AND METHOD FOR CONTROLLING A FUNCTION USING A VARIABLE SENSITIVITY RECEIVER

(75) Inventors: Tom Q. Tang, Novi, MI (US); Riad Ghabra, Dearborn Heights, MI (US); Ronald O. King, Brownstown, MI (US)

(73) Assignee: Lear Corporation, Southfield, MI (US)

( * ) Notice: Subject to any disclaimer, the term of this patent is extended or adjusted under 35 U.S.C. 154(b) by 388 days.

(21) Appl. No.: 11/161,238

(22) Filed: Jul. 27, 2005

(65) Prior Publication Data

US 2007/0024416 A1  Feb. 1, 2007

(51) Int. Cl.
*G05B 19/00* (2006.01)
(52) U.S. Cl. .................................... 340/5.61; 340/5.72
(58) Field of Classification Search ............... 340/5.72, 340/5.61, 5.62, 5.63, 5.64, 5.7; 455/136, 455/138, 241, 240.1
See application file for complete search history.

(56) References Cited

U.S. PATENT DOCUMENTS

| | | | |
|---|---|---|---|
| 4,642,646 A | 2/1987 | Rogers | |
| 4,670,746 A | 6/1987 | Taniguchi et al. | |
| 4,763,121 A | 8/1988 | Tomoda et al. | |
| 4,942,393 A | 7/1990 | Waraksa et al. | |
| 4,987,406 A | 1/1991 | Reid | |
| 5,319,364 A | 6/1994 | Waraksa et al. | |
| 5,355,525 A | 10/1994 | Lindmayer et al. | |
| 5,379,033 A | 1/1995 | Fujii et al. | |
| 5,479,156 A | 12/1995 | Jones | |
| 5,515,036 A | 5/1996 | Waraksa et al. | |
| 5,517,189 A | 5/1996 | Bachhuber et al. | |
| 5,600,323 A | 2/1997 | Boschini | |
| 5,602,535 A | 2/1997 | Boyles et al. | |
| 5,630,993 A | 5/1997 | Amatucci et al. | |
| 5,683,835 A | 11/1997 | Bruce | |

(Continued)

FOREIGN PATENT DOCUMENTS

EP    1466789 A1    10/2004

(Continued)

OTHER PUBLICATIONS

G.P. Butt et al., Lithium Metal Phosphate Cathodes For Li Secondary Batteries, J. Aust. Ceramic Soc., 34[1] 60-65 (1998).

*Primary Examiner*—Brian A Zimmerman
*Assistant Examiner*—Yong Hang Jiang
(74) *Attorney, Agent, or Firm*—Brooks Kushman P.C.

(57) ABSTRACT

A system and method of controlling a function using a variable sensitivity receiver, including a vehicle having the same. The method may include receiving a wireless control signal segment from a remote transmitter using the variable sensitivity receiver, decoding the wireless control signal segment using a controller in electronic communication with the variable sensitivity receiver, performing an attenuation step when the decoding is successful, generating a count for tracking an amount of attenuation performed, and determining whether to perform the function based at least in part on the count when the count is greater than or equal to a predetermined value or when the decoding is unsuccessful. The wireless control signal segment may include a request for the function and/or a partial request for the function. The attenuation step may include attenuating sensitivity of the variable sensitivity receiver by a predetermined amount.

20 Claims, 2 Drawing Sheets

U.S. PATENT DOCUMENTS

| | | |
|---|---|---|
| 5,738,957 A | 4/1998 | Amine et al. |
| 5,871,866 A | 2/1999 | Barker et al. |
| 5,910,382 A | 6/1999 | Goodenough et al. |
| 5,932,375 A | 8/1999 | Tarcy et al. |
| 6,049,268 A | 4/2000 | Flick |
| 6,085,015 A | 7/2000 | Armand et al. |
| 6,101,428 A | 8/2000 | Snyder |
| 6,153,333 A | 11/2000 | Barker |
| 6,285,296 B1 | 9/2001 | Christie |
| 6,570,486 B1 * | 5/2003 | Simon et al. ............... 340/5.1 |
| 6,656,635 B2 | 12/2003 | Okawa et al. |
| 6,855,273 B2 | 2/2005 | Ravet et al. |
| 2002/0041998 A1 | 4/2002 | Hosoya et al. |
| 2003/0189481 A1 * | 10/2003 | Hamid ................... 340/5.53 |
| 2005/0079841 A1 | 4/2005 | Astrachan et al. |
| 2006/0034206 A1 * | 2/2006 | Jacobi et al. ............... 370/324 |

FOREIGN PATENT DOCUMENTS

| | | |
|---|---|---|
| JP | 11026983 | 1/1999 |
| WO | 92 11431 | 7/1992 |
| WO | 9211431 A1 | 7/1992 |
| WO | WO 2004/036242 A1 | 4/2004 |

* cited by examiner

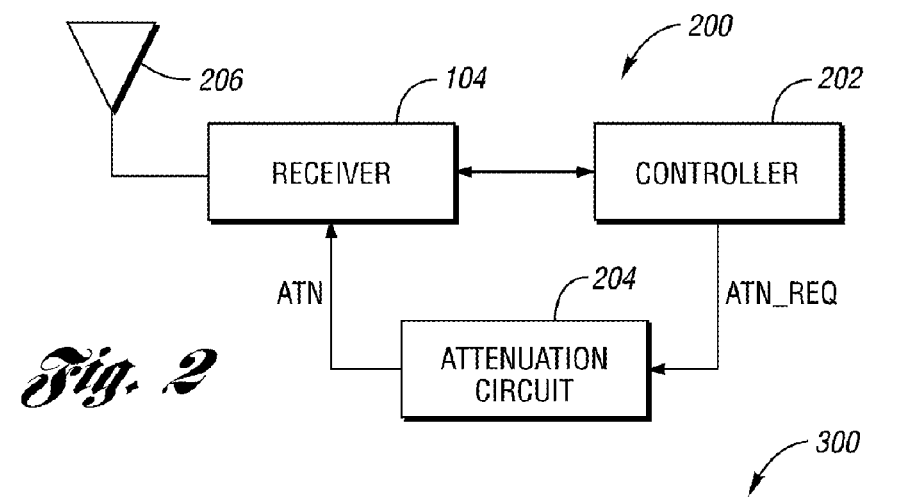
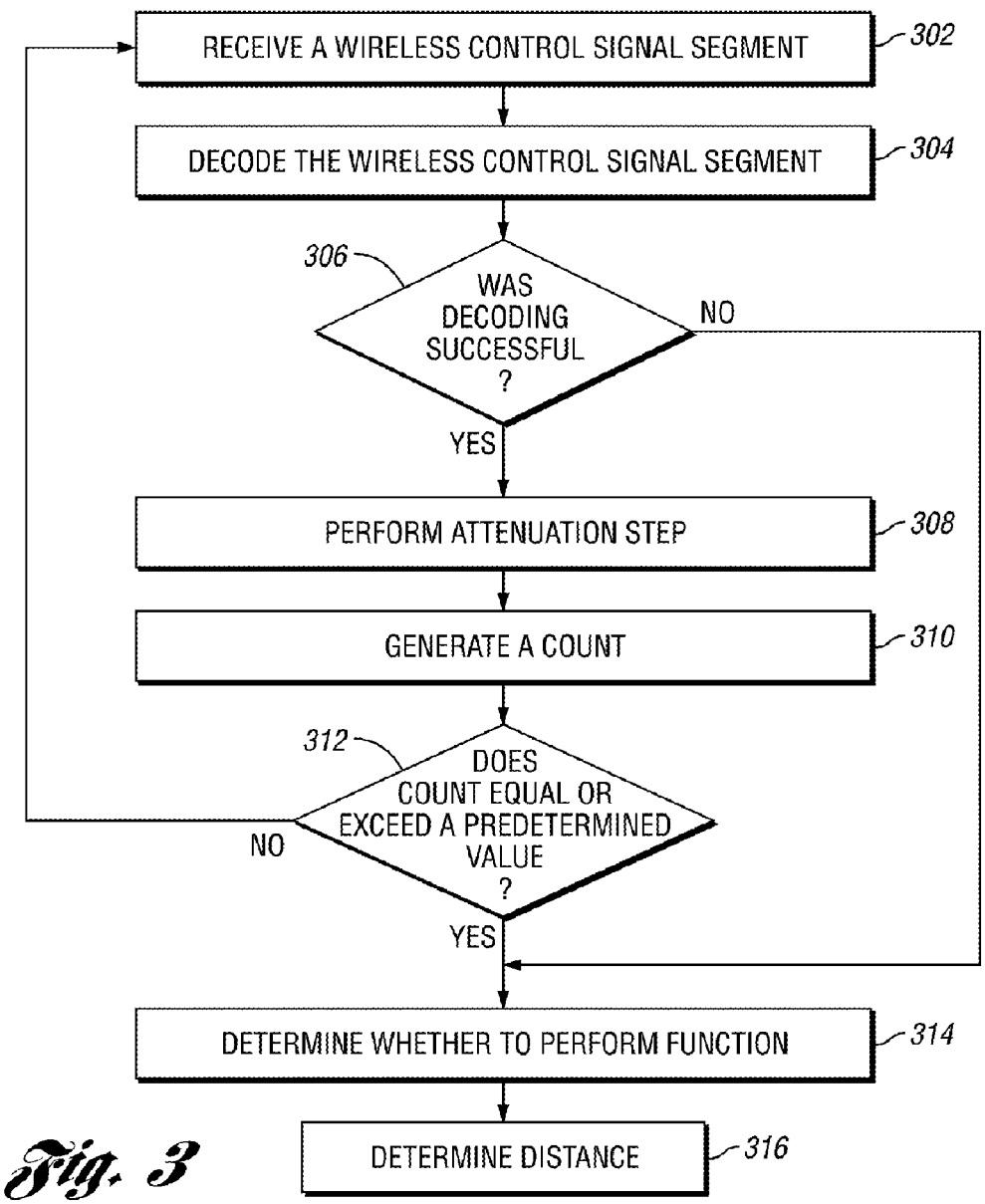

SYSTEM AND METHOD FOR CONTROLLING A FUNCTION USING A VARIABLE SENSITIVITY RECEIVER

BACKGROUND OF THE INVENTION

1. Field of the Invention

The present invention relates to a system and method for controlling a function, such as a vehicle function, using a variable sensitivity receiver.

2. Background Art

It is known in the automotive industry to provide for remote control of a vehicle function, such as through the use of remote keyless entry (RKE) systems. Such RKE systems typically use a hand-held remote transmitter (i.e., transponder), which is commonly referred to as a "fob" or "card." Currently available RKE fobs may be separate units, or may be part of an ignition key head. Such RKE fobs generally transmit radio frequency (RF) signals to a vehicle transponder in order to lock or unlock vehicle doors, open or close a vehicle sliding door, unlock a vehicle trunk, activate internal and/or external vehicle lights, activate a "panic" alarm, and/or perform a variety of other functions.

RKE systems may be characterized as active or passive systems. In active RKE systems, a switch or pushbutton on the remote transmitter must be activated by an operator in order to have a desired remote access function performed, such as locking or unlocking the vehicle doors. In passive RKE systems, however, no such switch or pushbutton activation by an operator is required in order to perform a desired remote access function.

More specifically, in a passive RKE system, a remote transponder, which again may be referred to as a "fob" or a "card," is typically provided for communicating with a transponder and/or control unit (i.e., receiver) installed in the vehicle. The vehicle transponder and/or control unit is provided in communication with door locking mechanisms to lock and unlock the vehicle doors in response to lock or unlock signals received from the remote transponder. In that regard, the remote transponder is carried by an operator and is designed to automatically unlock the vehicle as the operator approaches the vehicle, without the need for operation of any switch or pushbutton by the operator. Similarly, the system is further designed to automatically lock the vehicle as the operator, carrying the remote transponder, moves away from the vehicle.

It is further known in the automotive industry that a distance between a fob and a vehicle transponder may be determined by calculating the strength (i.e., power, watts) of a fob generated signal at the vehicle transponder. Such vehicle remote keyless entry systems generally use the distance to determine whether to perform a requested function. However, such vehicle remote keyless entry systems generally require a controller capable of calculating the power of a received signal. In that regard, a system and method for controlling a function that avoids the complexities associated with determining the power of a signal may be desirable.

SUMMARY OF THE INVENTION

Accordingly, at least one embodiment of the present invention may provide a system and/or method for controlling a function that avoids the complexities associated with determining the power of a signal. Similarly, at least one other embodiment of the present invention may provide a system and/or method for determining a distance between a fob and a vehicle transponder that avoids the complexities associated with determining the strength (i.e., power, watts) of a signal. The distance may be used for determining whether to perform a requested function. In at least one embodiment of the present invention, the system and/or method may reduce manufacturing costs through the elimination of a signal strength (i.e., power) determination component.

In at least one embodiment of the present invention, a method of controlling a function using a variable sensitivity receiver is provided. The method comprises receiving a wireless control signal segment from a remote transmitter using the variable sensitivity receiver, decoding the wireless control signal segment using a controller in electronic communication with the variable sensitivity receiver, performing an attenuation step when the decoding is successful, generating a count for tracking an amount of attenuation performed, and determining whether to perform the function based at least in part on the count when the count is greater than or equal to a predetermined value or when the decoding is unsuccessful. The wireless control signal segment comprises at least one of a request for the function and a partial request for the function. The attenuation step comprises attenuating sensitivity of the variable sensitivity receiver by a predetermined amount.

In at least one other embodiment of the present invention, a system for controlling a function using a variable sensitivity receiver is provided. The system comprises a variable sensitivity receiver for receiving a wireless control signal segment generated by a remote transceiver, a controller electronically coupled to the variable sensitivity receiver for decoding the wireless control signal segment, and an attenuation circuit electronically coupled to the controller and the variable sensitivity receiver for attenuating sensitivity of the variable sensitivity receiver by a predetermined amount when decoding is successful. The wireless control signal segment comprises at least one of a request for the function and a partial request for the function. The controller further generates a count for tracking sensitivity attenuation of the variable sensitivity receiver. The controller also determines whether to perform the function based at least in part on the count when the count is greater than or equal to a predetermined value or when decoding is unsuccessful.

In yet at least one other embodiment of the present invention, a system for controlling a vehicle function using a variable sensitivity receiver is provided. The system comprises a variable sensitivity receiver for receiving a wireless control signal segment from a remote vehicle keyless entry fob, a controller electronically coupled to the variable sensitivity receiver for decoding the wireless control signal segment, and an attenuation circuit electronically coupled to the controller and the variable sensitivity receiver for attenuating sensitivity of the variable sensitivity receiver by a predetermined amount when decoding is successful. The wireless control signal segment comprises at least one of a request for a vehicle function and a partial request for a vehicle function. The controller further generates a count for tracking sensitivity attenuation of the variable sensitivity receiver. The controller also determines whether to perform the vehicle function when the count is greater than or equal to a predetermined value or when decoding is unsuccessful.

BRIEF DESCRIPTION OF THE DRAWINGS

FIG. 2 is a schematic diagram of a variable sensitivity receiver control system according to one embodiment of the present invention;

FIG. 3 is a flow diagram of a method for controlling a function using a variable sensitivity receiver according to one embodiment of the present invention.

DETAILED DESCRIPTION

Figure 1:
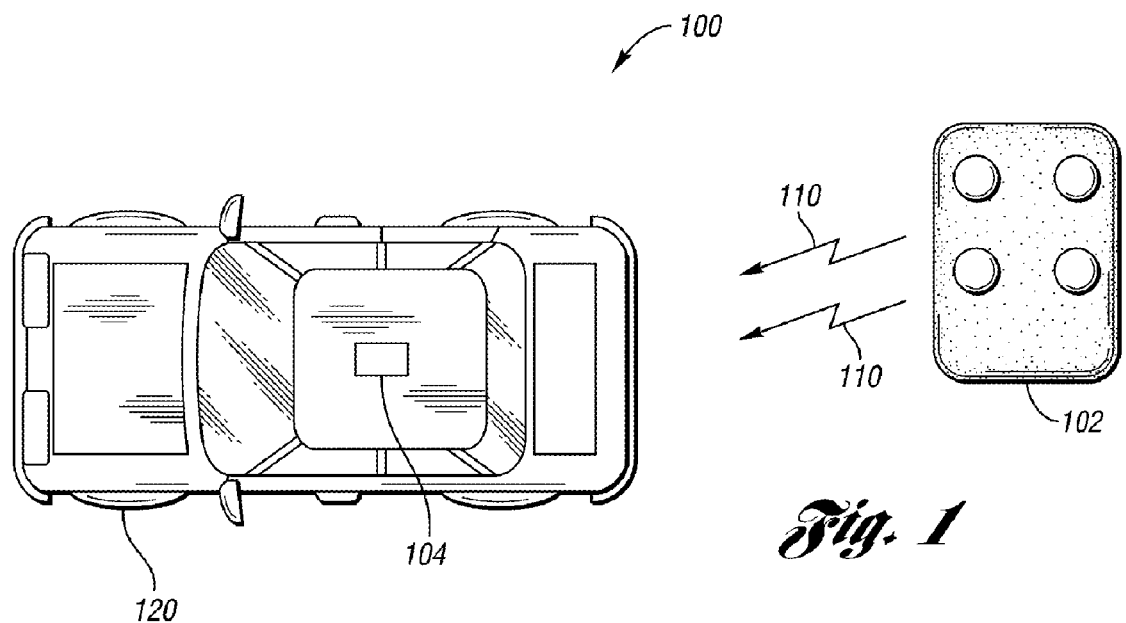
FIG. 1 is a schematic diagram of a system for controlling a function using a variable sensitivity receiver according to one embodiment of the present invention.

Referring to FIG. 1, a schematic diagram of a system 100 for controlling a function (e.g., a vehicle function) using a variable sensitivity receiver according to one embodiment of the present invention is provided. The system 100 generally comprises a remote transmitter (i.e., transceiver, transponder, and the like) 102, and a variable sensitivity receiver (i.e., transponder, transceiver, and the like) 104. In at least one embodiment of the present invention, the receiver 104 may be coupled to a motor vehicle 120 (i.e., vehicle).

The remote transmitter 102 may be electronically coupled to the variable sensitivity receiver 104 such that a wireless electronic signal (i.e., control signal) 110, such as a radio frequency (i.e., RF) signal and the like, may be transferred between the remote transponder 102 and the receiver 104. In at least one embodiment of the present invention, the electronic signal 110 comprises a request for a function (e.g., a vehicle function) and/or a portion of a request for a function. Furthermore, in at least one embodiment of the present invention, the electronic signal 110 may be bi-directionally transferred between the remote transmitter (i.e., transponder) 102 and the receiver 104. However, in at least one other embodiment of the present invention, the electronic signal 110 may be uni-directionally transferred between the remote transmitter 102 and the variable sensitivity receiver 104.

In general, the remote transmitter 102 may be any electronic device capable of generating the wireless electronic signal 110, such as a remote keyless entry (i.e., RKE) fob for use with an active and/or passive keyless entry system, a transponder, transceiver, and the like. In at least one embodiment of the present invention the remote transmitter 102 generates the electronic signal 110 using a single power level. However, it is contemplated that any appropriate number of power levels may be used to generate the electronic signal 110.

The variable sensitivity receiver 104 may be any electronic device capable of receiving the wireless electronic signal 110, such as a receiver, transceiver, transponder, and the like. For example, in at least one embodiment of the present invention the receiver 104 may be a transponder such that bi-directional communication may be established between the remote transponder 102 and the receiver 104.

It is further contemplated by the present invention that the receiver 104 may be electronically coupled (i.e., in electronic communication) to one or more actuators, electronic devices, and the like (not shown) such that a function (e.g., a vehicle function) may be performed in response to an electronic signal 110 received from the remote transmitter 102. In at least one embodiment of the present invention, the receiver 104 may be electronically coupled to a locking mechanism (not shown) to lock and/or unlock a vehicle door. In at least one other embodiment of the present invention, the receiver 104 may be electronically coupled to a horn (not shown) and/or a light (not shown) to perform a "panic" and/or "vehicle locate" function. However, the receiver 104 may be electronically coupled to any appropriate device to meet the design criteria of a particular application.

Referring to FIG. 2, a schematic diagram of a variable sensitivity receiver control system 200 according to one embodiment of the present invention is shown. The control system 200 generally comprises a variable sensitivity receiver 104, a controller 202, an attenuation circuit 204, and an antenna 206.

The receiver 104 may be electronically coupled to the antenna 206 for receiving the electronic signal 110 (i.e., communication signal, RF signal, and the like) from the remote transmitter 102 (shown in FIG. 1). In at least one embodiment of the present invention, the receiver 104 may also be electronically coupled to the controller 202 for presenting the electronic signal 110 to the controller 202. It is contemplated that the receiver 104 may modify the electronic signal 110 prior to presenting the electronic signal 110 to the controller 202.

The controller 202 may be a computer or other electronic device (e.g., logic circuit, application specific integrated circuit, microcomputer, processor, and the like) which executes software application programs and/or which performs other logical exercises. The controller 202 generally decodes (i.e., demodulates, deciphers) the electronic signal 110 such that a requested function (e.g., a vehicle function) may be determined (i.e., identified). Additionally, the controller 202 may generate an attenuation request signal (i.e., ATN_REQ). ATN_REQ generally represents a request to attenuate the incoming electronic signal 110. ATN_REQ may represent any appropriate amount of attenuation to meet the design criteria of a particular application. Furthermore, the amount of attenuation may be predetermined and/or calculated using any appropriate algorithm to meet the design criteria of a particular application.

The controller 202 may be electronically coupled (i.e., in electronic communication) to one or more actuators, electronic devices, and the like (not shown) such that the present invention may perform the requested function. In at least one embodiment of the present invention, the controller 202 may be electronically coupled to a locking mechanism (not shown) to lock and/or unlock a vehicle door. In at least one other embodiment of the present invention, the controller 202 may be electronically coupled to a horn (not shown) and/or a light (not shown) to perform a "panic" and/or "vehicle locate" function. However, the controller 202 may be electronically coupled to any appropriate device (i.e., component) to meet the design criteria of a particular application.

It is contemplated that all or part of the functionality of the controller 202 may be incorporated into a single controller (e.g., a vehicle system controller) as shown in FIG. 2. Alternatively, the functionality of the controller 202 may be distributed among a plurality of controllers.

The attenuation circuit 204 may be electronically coupled to the controller 202 for receiving the attenuation request signal (i.e., ATN_REQ). The attenuation circuit 204 may generate an attenuation signal (i.e., ATN) in response to ATN_REQ.

The attenuation circuit 204 is generally electronically coupled to the receiver 104 and/or the antenna 206 for presenting ATN to the receiver 104. As will be appreciated by one of ordinary skill in the art, the attenuation circuit 204 may comprise any combination of electronic components and/or devices capable of attenuating the electronic signal 110 at the receiver 104.

It is contemplated that signals may be received and passed between controllers 202 and/or other system 200 components (e.g., 104, 204, 206, actuators, motors, etc.) via a network (e.g., a controller area network—CAN), dedicated communication wires, and the like.

Referring to FIG. 3, a flow diagram of a method 300 for controlling a function (e.g., a vehicle function) using a variable sensitivity receiver according to one embodiment of the present invention is shown. The method 300 may be advantageously implemented in connection with the system 100, described previously in connection with FIG. 1, the control system 200, described previously in connection with FIG. 2, and/or any appropriate system to meet the design criteria of a particular application. The method 300 generally comprises a plurality of blocks or steps (e.g., steps 302, 304, 306, 308, 310, 312, 314 and 316) that may be performed serially. As will be appreciated by one of ordinary skill in the art, the steps of the method 300 may be performed in at least one non-serial (or non-sequential) order, and one or more steps may be omitted to meet the design criteria of a particular application.

As illustrated in step 302, a wireless control signal segment may be received, for example, using a variable sensitivity receiver (e.g., 104) and/or an antenna (e.g., 206). As previously discussed, the wireless control signal segment (i.e., wireless electronic signal, electronic signal, wireless control signal, control signal, control signal segment) may be generated by a remote transmitter or remote transponder (e.g., 102) and may comprise a request for a function (e.g., a vehicle function) and/or a partial request for a function. More particularly, the control signal segment may comprise a portion of an electronic signal (e.g., 110) or a portion of a sequence of electronic signals which may, in turn, comprise a request for one or more functions and/or a partial request for a function.

At step 304, the wireless control signal segment may be decoded (i.e., demodulate, decipher). As previously discussed, a controller (e.g., 202) and/or other logical device in electronic communication with the variable sensitivity receiver may be used to decode the control signal segment such that a requested function may be determined (i.e., identified).

At decision block 306, a controller and/or other logical device may determine if the control signal segment was successfully decoded. Any appropriate criteria may be used to determine when a control signal segment has been successfully decoded (i.e., demodulated into a request and/or a partial request for a function) to meet the design criteria of a particular invention. When the control signal segment has been successfully decoded (i.e., the YES leg of decision block 306), the method 300 falls through to step 308. Otherwise, the method 300 proceeds to step 314 (i.e., the NO leg of decision block 306).

In step 308, an attenuation step may be performed. The attenuation step generally comprises attenuating the sensitivity of the variable sensitivity receiver by a predetermined amount (i.e., quantity, degree, etc.) and may be performed using an attenuation circuit, such as the attenuation circuit 204 discussed in connection with FIG. 2 (i.e., the system 200).

At step 310, a count may be generated. The count may be generated using a controller and/or other logical device and generally corresponds to (i.e., tracks, indicates, etc.) the amount of attenuation performed on the variable sensitivity receiver (e.g., the number of attenuation steps performed).

At decision block 312, the count may be compared to a predetermined value. The method 300 falls through to step 314 when the count equals or exceeds (i.e., is greater than or equal to) the predetermined value (i.e., the YES leg of decision block 312). Otherwise, the method 300 returns to step 302 to receive another wireless control signal segment (i.e., the NO leg of decision block 312).

By returning to step 302, the variable sensitivity receiver may use the attenuated sensitivity to receive a subsequent wireless control signal segment. A controller and/or other logical device may attempt to decode the subsequent wireless control signal segment. Accordingly, the iterative process (i.e., method 300) may provide a determination of the amount of attenuation (e.g., number of attenuation steps 308) that renders a wireless control signal segment undecipherable (i.e., the NO leg of decision block 306). In the alternative, the iterative process may provide a determination that the wireless control signal segment may be successfully decoded at a predetermined maximum attenuation level (i.e., the YES leg of decision block 312).

In step 314, the controller and/or other logical device may determine whether to preform the requested function based at least in part on the count when the count equals or exceeds the predetermined value (i.e., the YES leg of decision block 312) and/or when the decoding of the wireless control signal segment is unsuccessful (i.e., the NO leg of decision block 306).

In general, when the count equals or exceeds the predetermined value (i.e., the YES leg of decision block 312), a maximum desired attenuation has been performed. Accordingly, when the control signal segment has been successfully decoded and the count equals or exceeds the predetermined value, the controller and/or other logical device determines that the remote transmitter is near (e.g., within a predetermined radius) the variable sensitivity receiver. The controller and/or other logical device may then determine whether to perform the requested function.

In one embodiment of the present invention, the controller and/or other logical device performs the requested function when the transmitter is determined to be within a predetermined radius of the variable sensitivity receiver. For example, a controller may perform door lock and/or unlock functions when the transmitter is determined to be within a predetermined radius of the variable sensitivity receiver. By performing a door lock/unlock function only when the remote transmitter is determined to be within a predetermined radius of the variable sensitivity receiver, the method 300 may reduce the likelihood that an operator may unintentionally lock/unlock a vehicle door from a far distance.

In another embodiment of the present invention, the controller does not perform the requested function when the transmitter is determined to be within a predetermined radius of the variable sensitivity receiver.

When the control signal segment has not been successfully decoded (i.e., the NO leg of decision block 306), the controller may determine whether to preform the requested function based at least in part on the count and one or more predetermined ranges. The count generally corresponds to the attenuated sensitivity at which the control signal segment was rendered undecipherable. In general, the one or more predetermined ranges (e.g., count ranges, attenuated sensitivity ranges, and the like) may be stored in a controller and/or may be stored in a device in electronic communication with the controller. An example of a system wherein a controller determines whether to preform a requested function based at least in part on the count and one or more predetermined range is provided in connection with FIG. 4.

In general, the controller and/or other logical device may be programmed (i.e., configured) to perform or not perform the requested function based at least in part on the count using any appropriate logic to meet the design criteria of a particular application.

At step 316, the controller may determine (e.g., calculate, use a look-up table, etc.) a distance between the variable sensitivity receiver and the remote transmitter based at least in part on the count. In at least one embodiment of the present invention, the controller may be calibrated during the manufacturing process to equate a number of counts with a predetermined distance. However, the distance may be calculated based at least in part on the count using any appropriate algorithm and/or mechanism to meet the design criteria of a particular application.

As described previously in connection with FIG. 2, it is contemplated that all or part of the functionality of the method 300 may be incorporated into a single controller and/or other logical device as shown in FIG. 2. Alternatively, the functionality may be distributed among a plurality of controllers and/or other logical devices.

Figure 4:
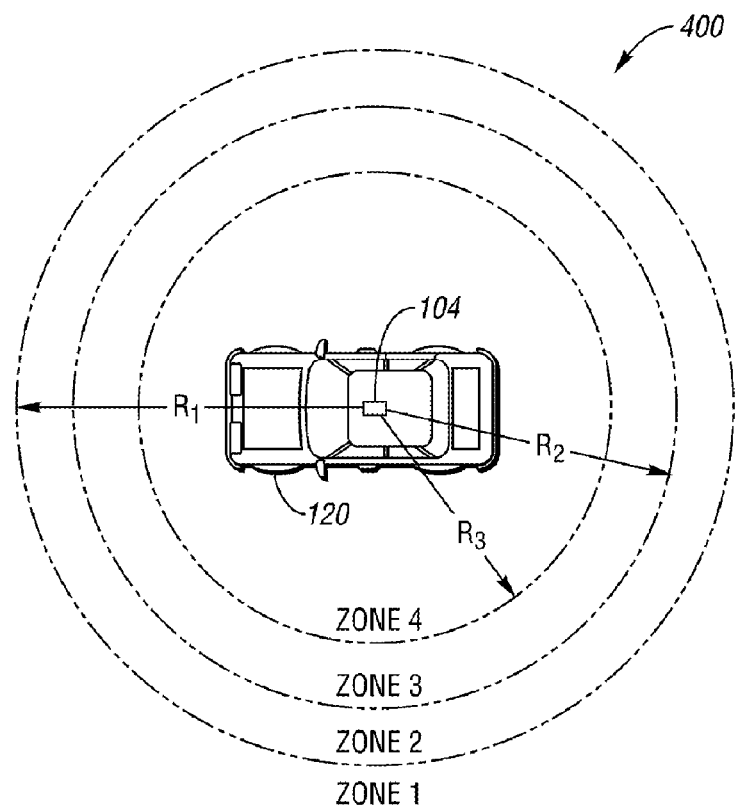
FIG. 4 is a schematic diagram of an exemplary embodiment of a system according to the present invention.

Referring to FIG. 4, a schematic diagram of an exemplary embodiment of a system 400 according to the present invention is provided. The system 400 may be advantageously implemented in connection with the system 100, the control system 200, and/or the method 300.

In the exemplary system 400, a controller 202 (not shown) may be programmed to determine the position of the remote transmitter 102 (not shown) in relation to one or more ranges (e.g., R1, R2, and R3) centered around a receiver 104. In one embodiment of the present invention, the controller 202 determines that the remote transmitter 102 may be located outside radius R1 (i.e., zone 1) when the count at the time of unsuccessful decoding (i.e., the NO leg of decision block 306) is less than or equal to X. Similarly, the controller 202 may determine that the remote transmitter 102 may be located between radius R1 and radius R2 (i.e., zone 2) when the count at the time of unsuccessful decoding is greater than X but less than or equal to Y. Furthermore, the controller 202 may determine that the remote transmitter 102 may be located between radius R2 and radius R3 (i.e., zone 3) when the count at the time of unsuccessful decoding is greater than Y but less than or equal to Z. When the count at the time of unsuccessful decoding (i.e., the NO leg of decision block 306) is greater than Z or the count equals or exceeds the predetermined value (i.e., the YES leg of decision block 312), then the controller 202 may determine that the remote transmitter 102 may be located within radius R3 (i.e., zone 4). As would be appreciated by one of ordinary sill in the art, the values of X, Y, Z, R1, R2, and R3 may be any appropriate values to meet the design criteria of a particular application, such as X=5, Y=10, Z=15, R1=100 feet, R2=25 feet, R3=10 feet. Furthermore, any appropriate number of ranges (e.g., R1, R2, R3) and/or zones (e.g., zone 1, zone 2, zone 3, zone 4) may be implemented to meet the design criteria of a particular application.

The exemplary system 400 has been described with reference to distances (e.g., R1, R2, R3). However, one of ordinary skill in the art would appreciate that the controller 202 may determine whether to perform a function without first converting a count to a distance. That is, the controller 202 and/or other logical device may determine whether to perform a requested function based on the count and one or more predefined ranges defined as counts (e.g., 1-5 counts, 6-10 counts, 11-15 counts, etc).

While the invention has been described in connection with a vehicle (e.g., the vehicle 120), it is contemplated that the invention may be implemented to control any appropriate function in connection with any appropriate system and/or device to meet the design criteria of a particular application.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of controlling a function using a variable sensitivity receiver, the method comprising: receiving a first wireless control signal segment from a remote transmitter using the variable sensitivity receiver, wherein the first wireless control signal segment comprises at least one of a request for the function and a partial request for the function; decoding the first wireless control signal segment using a controller in electronic communication with the variable sensitivity receiver; performing an attenuation step when the decoding is successful, wherein the attenuation step comprises attenuating sensitivity of the variable sensitivity receiver by a first predetermined amount; generating a first count for tracking an amount of attenuation performed; comparing the first count to a predetermined value; and determining whether to perform the function based on when the first count is greater than or equal to the predetermined value.

2. The method of claim 1 further comprising determining a distance between the variable sensitivity receiver and the remote transmitter based on when the first count is greater than or equal to the predetermined value.

3. The method of claim 1 wherein the function is a vehicle function.

4. The method of claim 1 wherein the remote transmitter is a remote keyless entry fob.

5. A system for controlling a function using a variable sensitivity receiver, the system comprising: a variable sensitivity receiver for receiving a first wireless control signal segment generated by a remote transmitter, wherein the first wireless control signal segment comprises at least one of a request for the function and a partial request for the function; a controller electronically coupled to the variable sensitivity receiver for decoding the first wireless control signal segment; and an attenuation circuit electronically coupled to the controller and the variable sensitivity receiver for attenuating sensitivity of the variable sensitivity receiver by a first predetermined amount when decoding is successful; wherein the controller is configured to generate a first count for tracking sensitivity attenuation of the variable sensitivity receiver, to compare the first count to a predetermined value, and to determine whether to perform the function based on when the first count is greater than or equal to the predetermined value.

6. The system of claim 5 wherein the controller is further configured to determine a distance between the variable sensitivity receiver and the remote transmitter based on when the first count is greater than or equal to a predetermined value.

7. The system of claim 5 wherein the function is a vehicle function.

8. The system of claim 5 wherein the remote transmitter is a remote keyless entry fob.

9. The system of claim 5 wherein the variable sensitivity receiver is electronically coupled to an antenna.

10. A system for controlling a vehicle function using a variable sensitivity receiver, the system comprising: a variable sensitivity receiver for receiving a first wireless control signal segment from a remote vehicle keyless entry fob, wherein the first wireless control signal segment comprises at least one of a request for a vehicle function and a partial request for a vehicle function; a controller electronically coupled to the variable sensitivity receiver for decoding the first wireless control signal segment; and an attenuation circuit electronically coupled to the controller and the variable sensitivity receiver for attenuating sensitivity of the variable sensitivity receiver by a first predetermined amount when decoding is successful; wherein the controller is configured to generate a first count for tracking sensitivity attenuation of the variable sensitivity receiver, to compare the first count to a predetermined value, and to determine whether to perform the vehicle function when the first count is greater than or equal to the predetermined value.

11. The system of claim 10 wherein the controller further determines a distance between the variable sensitivity receiver and the remote vehicle keyless entry fob based on when the count is greater than or equal to a predetermined value.

12. The system of claim 10 wherein the remote vehicle keyless entry fob is an active remote vehicle keyless entry fob.

13. The system of claim 10 wherein the remote vehicle keyless entry fob is a passive remote vehicle keyless entry fob.

14. The method of claim 1 further comprising:
receiving a second wireless control signal segment from the remote transmitter with the variable sensitivity receiver being attenuated by the first predetermined amount;
decoding the second wireless control signal segment using the controller in electronic communication with the variable sensitivity receiver; and
performing an additional attenuation step in response to successfully decoding the second wireless control signal.

15. The method of claim 14 wherein performing the additional attenuation step comprises attenuating sensitivity of the variable sensitivity receiver by a second predetermined amount.

16. The method of claim 14 further comprising: generating a second count for tracking an amount of attenuation performed with the additional attenuation step; comparing the second count to the predetermined value; and determining whether to perform the function based on when the second count is greater than or equal to the predetermined value.

17. The system of claim 5 wherein the variable sensitivity receiver is configured to receive a second wireless control signal segment from the remote transmitter while being attenuated by the first predetermined amount and the attenuation circuit is configured to attenuate sensitivity of the variable sensitivity receiver by a second predetermined amount in response to the controller successfully decoding the second wireless control signal segment.

18. The system of claim 17 wherein the controller is configured to: generate a second count for tracking an amount of attenuation performed while attenuating sensitivity of the variable sensitivity receiver by the second predetermined amount; compare the second count to the predetermined value; and determine whether to perform the function based on when the second count is greater than or equal to the predetermined value.

19. The system of claim 10 wherein the variable sensitivity receiver is configured to receive a second wireless control signal segment from the remote transmitter while being attenuated by the first predetermined amount and the attenuation circuit is configured to attenuate sensitivity of the variable sensitivity receiver by a second predetermined amount in response to the controller successfully decoding the second wireless control signal segment.

20. The system of claim 19 wherein the controller is configured to: generate a second count for tracking an amount of attenuation performed while attenuating sensitivity of the variable sensitivity receiver by the second predetermined amount; compare the second count to the predetermined value; and determine whether to perform the function based on when the second count is greater than or equal to the predetermined value.

* * * * *

UNITED STATES PATENT AND TRADEMARK OFFICE
CERTIFICATE OF CORRECTION

PATENT NO. : 7,609,146 B2  Page 1 of 1
APPLICATION NO. : 11/161238
DATED : October 27, 2009
INVENTOR(S) : Tang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 615 days.

Signed and Sealed this

Twelfth Day of October, 2010

David J. Kappos
*Director of the United States Patent and Trademark Office*